Figure 1:
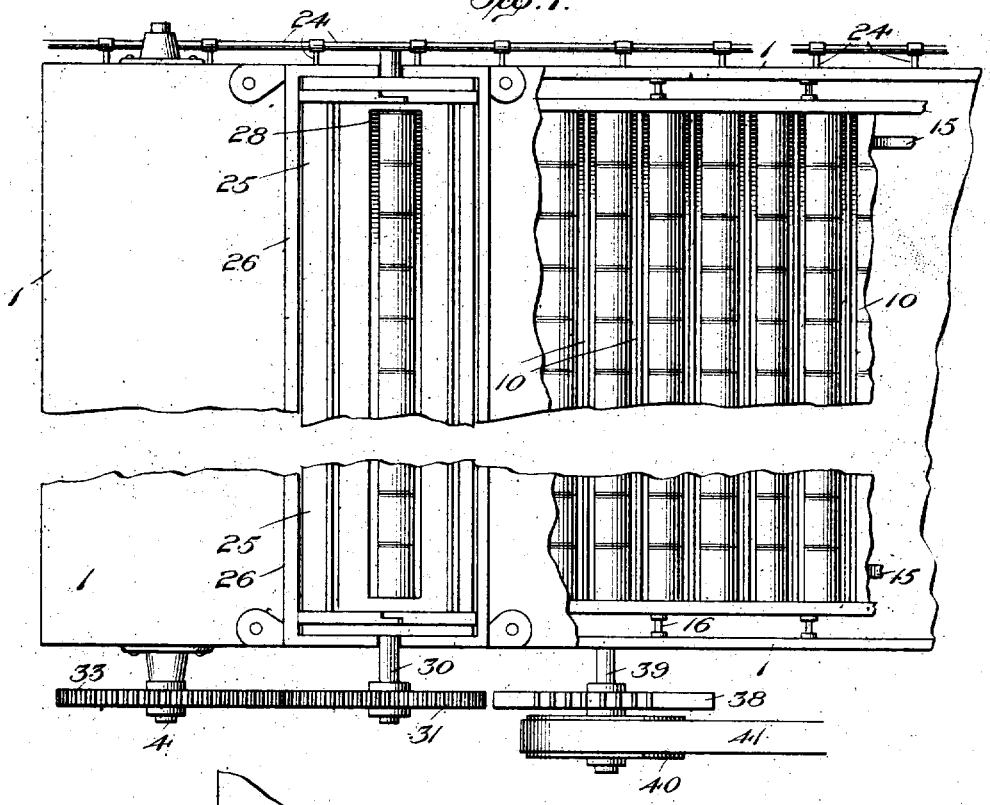

J. JENNINGS.

AGITATING COOKER AND PROCESSER.

APPLICATION FILED MAR. 31, 1909.

Reissued Aug. 24, 1909.

13,015.

2 SHEETS—SHEET 1.

Witnesses

Edwin L. Bradford

C. B. Clark

Inventor

John Jennings

By A. O. Behel.

Attorney

J. JENNINGS.

AGITATING COOKER AND PROCESSER.

APPLICATION FILED MAR. 31, 1909.

Reissued Aug. 24, 1909.

13,015.

2 SHEETS—SHEET 2.

Witnesses

Edwin L. Bradford

C. B. Clark

Inventor

John Jennings.

By A. O. Behel.

Attorney

UNITED STATES PATENT OFFICE.

JOHN JENNINGS, OF GREENWOOD, INDIANA, ASSIGNOR, BY MESNE ASSIGNMENTS, TO AUTOMATIC COOKER COMPANY, A CORPORATION OF ILLINOIS.

AGITATING COOKER AND PROCESSER.

13,015. Specification of Reissued Letters Patent. Reissued Aug. 24, 1909.

Original No. 865,645, dated September 10, 1907, Serial No. 349,415. Application for reissue filed March 31 1909. Serial No. 487,089.

*To all whom it may concern:*

Be it known that I, JOHN JENNINGS, a citizen of the United States, residing at Greenwood, in the county of Johnson and State of Indiana, have invented certain new and useful Improvements in Agitating Cookers and Processers, of which the following is a specification.

This invention relates to an agitating cooker for sterilizing canned goods; and the object of the invention is to provide a machine embodying a sterilizing chamber that is capable of receiving and sterilizing a large number of cans, thereby giving the machine a large working capacity, this being of utmost importance, since considerable time is necessary, and is consumed, to properly heat the product within the cans by bringing it to the desired temperature to effect the necessary sterilization to destroy future bacterial development and growth.

A further object of the invention is to provide means for supporting the cans on their sides and rolling them through the cooking chamber to bring the contents successively above the axes of the cans, and by arresting the movement of the cans at intervals, to permit that portion of the contents carried upward by the movement of the cans to settle back, all of the contents of each can will finally be brought to the surface.

A further object of the invention is to provide a cooker which will afford sufficient travel for the cans between the inlet and outlet valves to insure the contents of the cans to be perfectly sterilized before the cans are discharged from the cooker.

A further object of the invention is to provide a cooker for sterilizing canned goods which is provided at intervals with pipes which inject jets of steam to play upon the cans as they roll through the cooking chamber.

The further object of this invention is to mount one of the shafts and a director to change the direction of the movement of the cans so that they move in unison, in order that the tension of the chains carried by the sprocket wheels on the shafts may be adjusted without disturbing the relative position of the director thereto.

I accomplish the several objects of the invention by means of the cooker illustrated in the accompanying drawings, in which—

Figure 4:
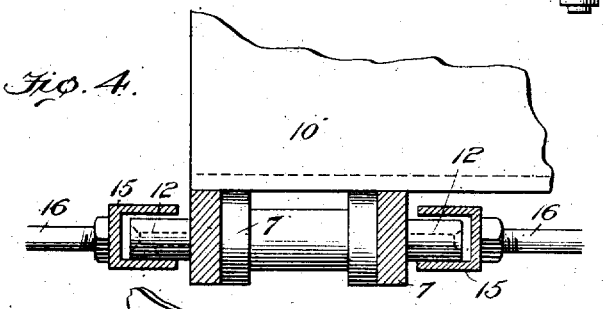
Figure 5:
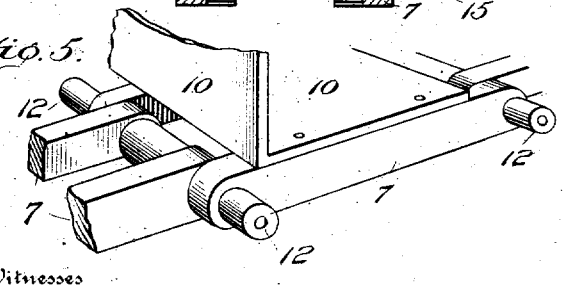
Figure 6:
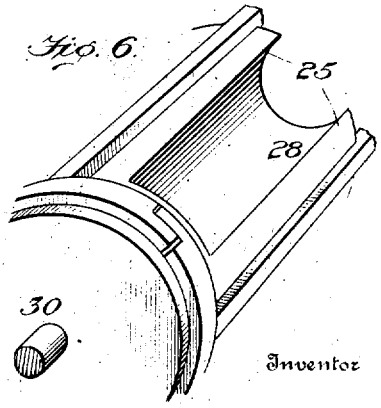
Figure 2:
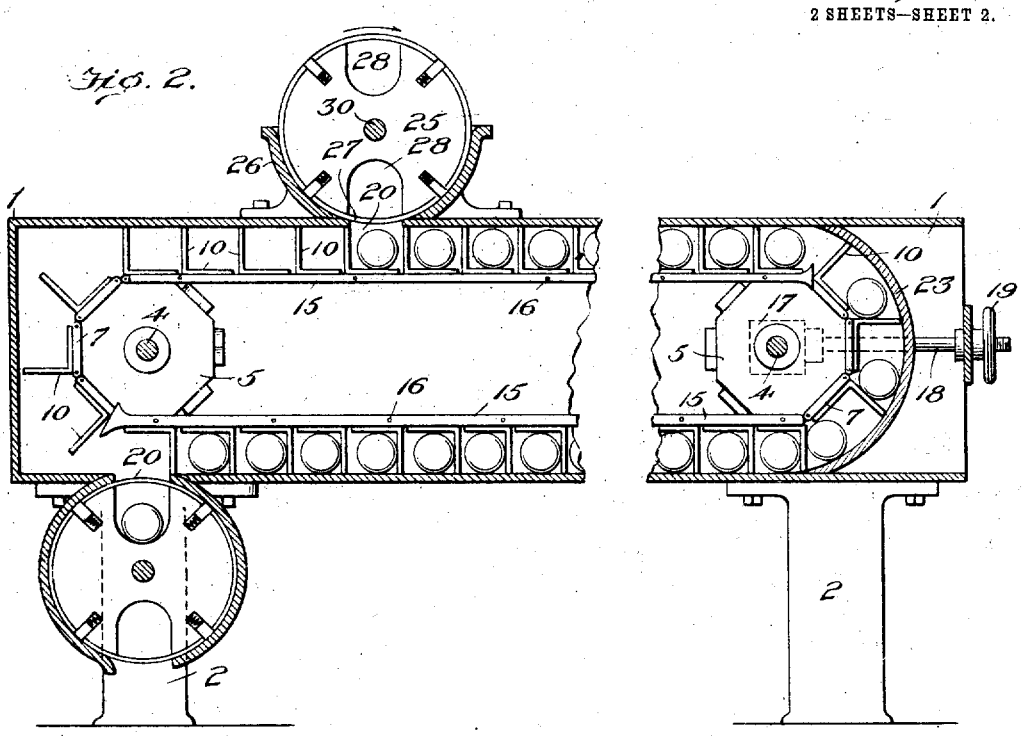
Figure 3:
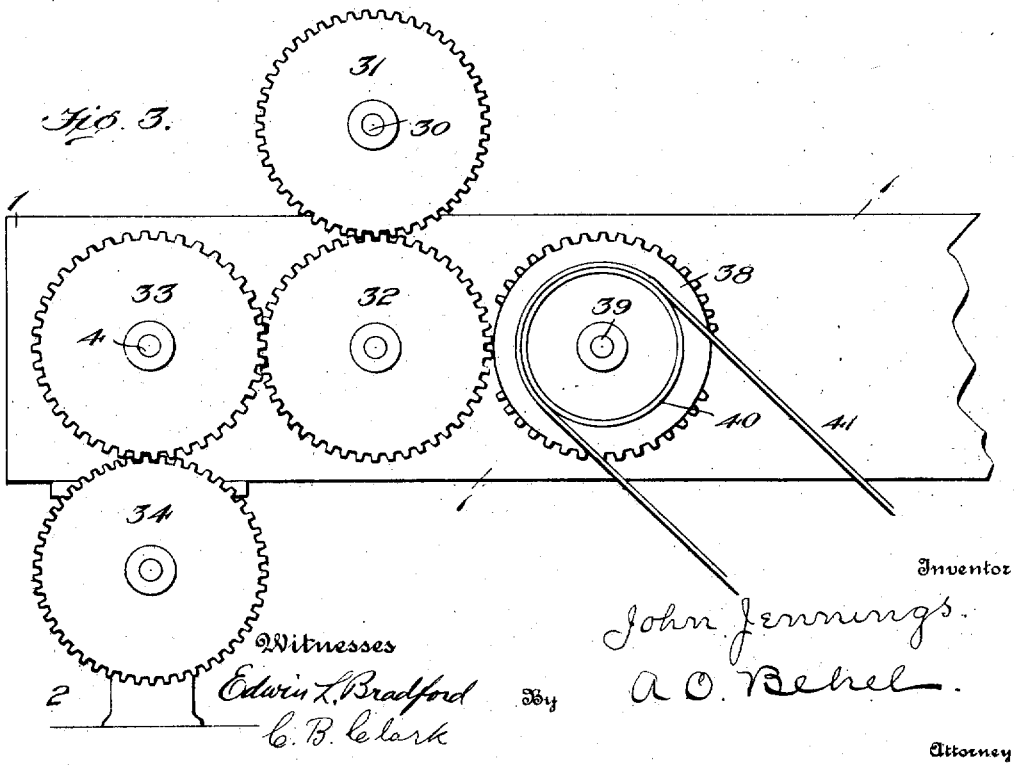

Figure 1 is a fragmentary detail view of the feed end of a cooker, showing a portion thereof in plan and a portion in section, in order to expose the cans and show the position they occupy while passing through the sterilizing chamber. Fig. 2 is a central vertical sectional view of the cooker in which the central portion thereof is broken away. Fig. 3, is a fragmentary detail view in side elevation of the feed end of the cooker, showing the chain of pinions through which the movable parts are driven. Fig. 4, is a fragmentary detail view, on an enlarged scale, showing the means for supporting the conveyer-chains. Fig. 5, is a fragmentary detail perspective view showing the construction, or formation, of the conveyer-chains. Fig. 6, is a fragmentary detail perspective view of the device for both introducing and removing the cans from the cooker.

In the drawings, 1 represents a rectangularly shaped box or frame which forms the main body of the machine. This frame is preferably composed of sheet steel, and forms an inclosure or chamber in which the canned product is sterilized. This frame is provided with suitable supporting legs 2.

A shaft 4 is mounted in each end of the body 1, and extends transversely through the sterilizing chamber. Each of these shafts carry a plurality of sprocket-wheels 5, which are keyed thereto and revolve therewith. A sprocket-chain 7 connects a sprocket-wheel 5 on each of the shafts 4, so that when one shaft is operated movement will be imparted to the other. The links forming the sprocket-chains 7 are of a length equaling the diameter of the cans, and the links comprising the oppositely positioned chains are divided in groups of pairs which are tied together by the right-angle plates 10. These plates are rigidly secured at the ends with the links, and the horizontal portions of the plates 10 form the bottoms of the channels on which the cans ride while passing through the upper portion of the cooking chamber. The channels for retaining the cans are formed by means of the vertically extending portions of the plates 10. These vertical extensions of the plates 10 bear against the internal wall of the body 1 so that the open ends of the channels are sealed, so as to prevent the cans from crawling over one another, to interfere with the operation of the machine. The plates 10 extend transversely and nearly the entire width of the sterilizing chamber, so that each channel is of considerable length and is capable of carrying a large number of cans to be simultaneously sterilized which, in a measure, illustrates the large working capacity of the machine.

To keep the upper portion of the conveyer-chains in alinement when heavily ladened with canned goods, I support said conveyer at each link. These links are provided with the antifriction rollers 12, which engage the channeled ways 15. See Fig. 4. These ways are supported by the stay-rods 16 and extend to and engage the frame 1.

To maintain a proper tension on the conveyer-chains 7 and take up such lost motion as may result from wear, I mount the shaft 4, in one end of the machine, in the movable journal-boxes 17, and by means of the screw-shafts 18, which engage said boxes and the frame 1, the journal-boxes may be moved in a direction to tighten the chains, by means of the hand-wheels 19. To compensate for the adjustability of the shaft 4, the end-wall 23 of the sterilizing chamber is secured to and moves with the journal-boxes 17, so as to keep the relative positions of the sprocket-wheels 5 and the end-wall 23 the same.

The frame 1, forming the sterilizing chamber, is provided on its upper and lower surface with an inlet and an outlet aperture 20, through which the cans pass into and out of the machine. These apertures are located with relation to each other as to afford the cans the greatest amount of travel through the chamber, and thereby insure that the canned product will be thoroughly sterilized before it is discharged from the machine. The canned product is preferably sterilized by subjecting the cans to jets of live steam which will play upon the cans while they are passing through the chamber. The steam is fed into the chamber through numerous pipes 24, which are located at convenient points along the side-wall of the sterilizing chamber.

In order to sterilize a large number of cans with regularity and despatch, and reduce as much as possible the necessity for manual labor, I provide a device at the inlet and outlet apertures of the sterilizing chamber which will introduce and remove cans into and out of the machine. This device consists of a cylindrically shaped drum 25, which is suitably supported in a segmentally formed trough 26. This trough is secured to the frame 1 in any desired manner, and is provided with an aperture 27 in its bottom corresponding to and registering with the inlet and the outlet apertures in the sterilizing chamber.

The drum is provided with longitudinally extending can-holding channels 28 into which the cans are placed, and as the drum is operated the cans are either fed into or removed from the sterilizing chamber.

The drum 25 is provided with a shaft 30 which carries the pinion 31 whereby said drum is operated. This pinion meshes with a chain of pinions, one of which constitutes the idler pinion 32 which meshes with the pinion 33, secured to the end of the shaft 4, and by which the conveyer-chains 7 are driven. The pinion 33 meshes with a corresponding pinion 34 secured to the shaft that drives the discharge device, which removes the cans from the sterilizing chamber. This chain of pinions, namely 31, 32, 33 and 34, together with the mechanism they drive, which include the feed and discharge devices and the conveyer-chains 7, are given an intermittent movement received through the mutilated pinion 38, which is mounted on the shaft 39. The shaft 39 also carries the pulley 40, and by means of the belt 41 which leads to a suitable power source, the mutilated pinion 38 is given a slow continuous movement, and through its periodical engagement with the idler pinion 32, the movable parts are given an intermittent movement, as above pointed out. Each movement so imparted to the feed and discharge devices is sufficient to give each device enough rotary movement to bring one of the longitudinally extending can-receiving channels 28 therein into registration with the inlet and outlet apertures so that a series of cans will simultaneously be introduced into and removed out of the sterilizing chamber. The movement between the feed and discharge devices and the conveyer is so timed that while the devices are introducing and removing the cans the conveyer will have moved forward a sufficient distance to bring a channel on the conveyer, formed by the vertical extensions of the right angle plates 10, beneath and above the inlet and outlet apertures 20 in the sterilizing chamber. The cylindrical drums 25 and the troughs 26 not only introduce and remove the cans from the machine, but they also form valves for closing the inlet and outlet apertures 20 so that the steam, which is employed for sterilizing the canned product and is under pressure within the chamber cannot escape.

I prefer an intermittent movement especially for the conveyer, for the reason that with an interruption in the movement of the conveyer and then with each pulsation of movement which urges the conveyer forward the contents of the cans will be agitated, or, in other words, shifted about, so that the entire bulk in each can is thoroughly and evenly heated and thus sterilized which is the end sought.

I am aware that cans containing food have been supported on their sides and have been rolled continuously through a cooking chamber, as shown for example in Patent No. 498,358 to Merrill & Lovell, and I am also aware of Patent No. 628,554, to Smith, but I have found by experience that the contents of the cans is not mixed by such continuous rolling. I am also aware of Patent No. 798,833, to Ruff in which suspended cages holding the material to be treated are moved intermittently, and of Patent No. 539,124 to Empson in which crates containing the goods to be processed are moved intermittently through the cooking chamber, but in neither case is the can rolled to bring different portions of the solid contents successively to the periphery of the bulk, and this intermittent travel of the cages and crates does not mix the contents of the cans.

I have found by experience that by supporting the cans on their sides and rolling them through the cooking chamber, brings all of the contents of the can successively above the axis of the can, and that by arresting the can's movement at intervals, permitting that portion of the contents carried upward by the movement of the can to drop, a thorough mixing of the contents of each can is ultimately accomplished.

Having thus fully described my said invention, what I desire to secure by Letters Patent is—

1. An agitating cooker for canned goods comprising a hollow steam tight body having one of its ends movably mounted and curved outward, and provided with inlet and outlet openings, a shaft carrying sprocket wheels extending transversely through said body near each end, means for movably mounting the shaft adjacent to the curved end of the body, and means for simultaneously moving the movably mounted shaft and the curved end of the body, to maintain a uniform distance between said shaft and end.

2. An agitating cooker for canned goods comprising a hollow steam tight body having one of its ends movably mounted and curved outward, and provided with inlet and outlet openings, a shaft carrying sprocket wheels extending transversely through said body near each end, conveyer chains movably mounted within said body and adapted to engage the sprocket wheels, plates for securing the conveyer chains together, and means for simultaneously moving the movably mounted shaft and the curved body end, to maintain a uniform distance between said shaft and end.

3. An agitating cooker for canned goods comprising a hollow steam tight body having one of its ends movably mounted and curved outward, and provided with inlet and outlet openings, a shaft carrying sprocket wheels extending transversely through said body near each end, conveyer chains movably mounted within said body and adapted to engage the sprocket wheels, right-angle bent channel forming plates secured to the conveyer chains and so arranged that the vertically extending portions of said plates will bear against the inner walls of the body, and means for simultaneously moving the movably mounted shaft and curved body end, to maintain a uniform distance between said shaft and end.

4. An agitating cooker for canned goods comprising a hollow steam tight body having one of its ends movably mounted and curved outward, and provided with inlet and outlet openings, a rotary feed and discharge device provided with pockets mounted above the inlet and below the outlet openings respectively of said body, a shaft carrying sprocket wheels extending transversely through said body near each end, conveyer chains movably mounted within said body and adapted to engage the sprocket wheels, plates for securing the sprockets and chains together, and means for simultaneously moving the movably mounted shaft and the curved body end, to maintain a uniform distance between said shaft and end.

5. In a machine for sterilizing or cooking canned goods, the combination with means for supporting on their sides cans containing material to be heated, of means for progressively and intermittently rolling said cans to carry portions of the material upwardly therein during the rolling action, said means affording periods of intermission between the rolling actions, permiting the heavier of the material to drop to the lower sides of the cans, and means for heating said cans.

6. In a machine for sterilizing or cooking canned goods, the combination with means for supporting on their sides cans containing material to be heated, of a conveyer for effecting the progressive rotation of the cans over the support, and means for effecting an intermittent movement of the conveyer at a speed to roll the cans and carry upwardly portions of the material contained therein, said means affording periods of rest to said conveyer, permitting the heavier of the material so carried up to gravitate.

7. A cooker for canned goods comprising a hollow steam tight body provided with inlet and outlet openings, a shaft carrying sprocket wheels extending transversely through said body near each end, means for movably mounting one of the shafts, conveyer chains supported by the sprocket wheels, plates connecting the chains and extending outward therefrom, a director for changing the direction of the movements of the cans, and means for moving the movably mounted shaft and the director in unison.

In witness whereof, I, have hereunto set my hand at Greenwood, Ind., this 6th day of January 1909.

JOHN JENNINGS.

Witnesses:
ERSCHEL TURNER,
GEO. BEERS.